US012639581B2

(12) United States Patent
Choi et al.

(10) Patent No.: US 12,639,581 B2
(45) Date of Patent: May 26, 2026

(54) METHOD AND APPARATUS FOR DATA-FREE NETWORK QUANTIZATION AND COMPRESSION WITH ADVERSARIAL KNOWLEDGE DISTILLATION

(71) Applicant: Samsung Electronics Co., Ltd., Gyeonggi-do (KR)

(72) Inventors: Yoo Jin Choi, San Diego, CA (US); Jihwan Choi, Daegu (KR); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 640 days.

(21) Appl. No.: 17/021,686

(22) Filed: Sep. 15, 2020

(65) Prior Publication Data

US 2021/0295173 A1 Sep. 23, 2021

Related U.S. Application Data

(60) Provisional application No. 62/993,258, filed on Mar. 23, 2020.

(51) Int. Cl.
G06N 3/088 (2023.01)
G06N 3/045 (2023.01)

(52) U.S. Cl.
CPC .............. G06N 3/088 (2013.01); G06N 3/045 (2023.01)

(58) Field of Classification Search
CPC ................................ G06N 3/088; G06N 3/045
USPC .......................................................... 706/25
See application file for complete search history.

(56) References Cited

U.S. PATENT DOCUMENTS

| | | | |
|---|---|---|---|
| 5,519,805 A * | 5/1996 | King | G10L 15/16 704/202 |
| 9,990,687 B1 | 6/2018 | Kaufhold et al. | |
| 10,963,748 B1 * | 3/2021 | Tulyakov | G06F 18/2148 |
| 2018/0082172 A1 | 3/2018 | Patel et al. | |
| 2018/0211164 A1 * | 7/2018 | Bazrafkan | G06N 3/045 |
| 2019/0205748 A1 * | 7/2019 | Fukuda | G06N 3/044 |
| 2019/0259474 A1 * | 8/2019 | Wang | G16C 60/00 |
| 2019/0295302 A1 | 9/2019 | Fu et al. | |

(Continued)

FOREIGN PATENT DOCUMENTS

| | | | |
|---|---|---|---|
| CN | 109637546 | | 4/2019 |
| CN | 110045335 A | * | 7/2019 |
| CN | 110246171 | | 9/2019 |

(Continued)

OTHER PUBLICATIONS

Fang et al, Mar. 2, 2020, "Data-Free Adversarial Distillation" (Year: 2020).*

(Continued)

*Primary Examiner* — Abdullah Al Kawsar
*Assistant Examiner* — Jun Kwon
(74) *Attorney, Agent, or Firm* — The Farrell Law Firm, P.C.

(57) ABSTRACT

A method and system are provided. The method includes receiving, at a generator, a random input, producing, at the generator, a synthetic output of the received random input, receiving, at a teacher network, the synthetic output, receiving, at a student network, the synthetic output, minimizing a maximum of a distance between an output of the teacher network and an output of the student network, and constraining the generator.

10 Claims, 4 Drawing Sheets

100

(56) References Cited

U.S. PATENT DOCUMENTS

| | | | | |
|---|---|---|---|---|
| 2020/0167914 | A1* | 5/2020 | Stamatoyannopou | ..................... |
| | | | | G16B 40/20 |
| 2020/0334538 | A1* | 10/2020 | Meng | ..................... G10L 15/16 |

FOREIGN PATENT DOCUMENTS

| | | | |
|---|---|---|---|
| JP | | 2018-068752 | 5/2018 |
| JP | | 2018068752 A | * 5/2018 |
| WO | WO 2019/183584 | | 9/2019 |
| WO | WO 2019/213459 | | 11/2019 |
| WO | WO 2019/222401 | | 11/2019 |
| WO | WO 2020/028382 | | 2/2020 |

OTHER PUBLICATIONS

Chen et al, 2017, "Learning Efficient Object Detection Models with Knowledge Distillation" (Year: 2017).*
Pan et al, 2018, "Two at Once: Enhancing Learning and Generalization Capacities via IBN-Net" (Year: 2018).*
Mittal et al, 2019, "Semi-Supervised Semantic Segmentation with High- and Low-level Consistency" (Year: 2019).*
Nagel et al, 2019, "Data-Free Quantization Through Weight Equalization and Bias Correction" (Year: 2019).*
Andritsos et al, 2003, "Clustering Categorical Data based on Information Loss Minimization" (Year: 2003).*
Lopes et al, 2017, "Data-Free Knowledge Distillation for Deep Neural Networks" (Year: 2017).*
Bao et al, 2018, "Cross-Entropy Pruning for Compressing Convolutional Neural Networks" (Year: 2018).*
Liu et al, 2017, "Large-Margin Softmax Loss for Convolutional Neural Networks" (Year: 2017).*
Yasuda et al, Jan. 7, 2020, "Consistent batch normalization for weighted loss in imbalanced-data environment" (Year: 2020).*
Xie et al. "Improving Fast Segmentation With Teacher-student Learning", 2018 (Year: 2018).*
Geoffrey Hinton et al. Distilling the knowledge in a neural network. arXiv preprint arXiv:1503.02531, 2015, pp. 9.
Adriana Romero et al. Fit-Nets: Hints for thin deep nets. In International Conference on Learning Representations, 2015, pp. 13.
Sergey Zagoruyko et al. Paying more attention to attention: Improving the performance of convolutional neural networks via attention transfer . . . In International Conference on Learning Representations, 2017, pp. 13.
Sungsoo Ahn, et al. Variational information distillation for knowledge transfer. In Proceedings of the IEEE Conference on Computer Vision and Pattern Recognition, . . . pp. 9163-9171, 2019.
Yuntao Chen et al. Dark-Rank: Accelerating deep metric learning via cross sample similarities transfer . . . In Proceedings of the AAAI Conference on Artificial Intelligence, 2018, pp. 9.
Wonpyo Park et al. Relational knowledge distillation. In Proceedings of the IEEE Conference on Computer Vision and Pattern Recognition, 3967-3976, 2019.
Raphael Gontijo Lopes et al. Data-free knowledge distillation for deep neural networks. In NeurIPS Workshop on Learning with Limited Data, 2017.
Kartikeya Bhardwaj et al. Dream distillation: A data-independent model compression framework . . . In ICML Joint Workshop on On-Device Machine Learning and Compact Deep Neural Network Representations (ODML-CDNNR), 2019, pp. 4.
Hanting Chen, et al. Data-free learning of student networks. In Proceedings of the IEEE International Conference on Computer Vision, pp. 3514-3522, 2019.
Paul Micaelli et al. Zero-shot knowledge transfer via adversarial belief matching. In Advances in Neural Information Processing Systems, pp. 9547-9557, 2019.
Kaiming He et al. Deep residual learning for image recognition. In Proceedings of the IEEE Conference on Computer Vision and Pattern Recognition, pp. 770-778, 2016.

Sergey Zagoruyko et al. Wide residual networks. In Proceedings of the British Machine Vision Conference, pp. 87.1-87.12, 2016.
Yuval Netzer et al. Reading digits in natural images with unsupervised feature learning. In NeurIPS Workshop on Deep Learning and Unsupervised Feature Learning, 2011, pp. 9.
Alex Krizhevsky. Learning multiple layers of features from tiny images. Technical report, Univ. of Toronto, 2009, pp. 60.
Hongxu Yin et al. Dreaming to distill: Data-free knowledge transfer via DeepInversion. arXiv preprint arXiv: 1912.08795, 2019.
Raghuraman Krishnamoorthi. Quantizing deep convolutional networks for efficient inference: A whitepaper. arXiv preprint arXiv:1806. 08342, 2018, pp. 36.
Gaurav Kumar Nayak et al. Zero-shot knowledge distillation in deep networks. In International Conference on Machine Learning, pp. 4743-4751, 2019.
Jaemin Yoo et al. Knowledge extraction with no observable data. In Advances in Neural Information Processing Systems, pp. 2701-2710, 2019.
Markus Nagel et al. Data-free quantization through weight equalization and bias correction. In Proceedings of the IEEE International Conference on Computer Vision, . . . pp. 1325-1334, 2019.
Aharon Ben-Tal et al. Robust Optimization, vol. 28. Princeton University Press, 2009, pp. 455.
Dimitris Bertsimas et al. Theory and applications of robust optimization. SIAM review, 53(3):464-501, 2011.
Naveed Akhtar et al. Threat of adversarial attacks on deep learning in computer vision: A survey. IEEE Access, 6:14410-14430, 2018.
Ian J. Goodfellow et al. Explaining and harnessing adversarial examples. In International Conference on Learning Representations, 2014, pp. 11.
Nicholas Carlini et al. Towards evaluating the robustness of neural networks. In IEEE Symposium on Security and Privacy, pp. 39-57, 2017.
Aleksander Madry et al. Towards deep learning models resistant to adversarial attacks. In International Conference on Learning Representations, 2018.
Omid Poursaeed et al. Generative adversarial perturbations. In Proceedings of the IEEE Conference on Computer Vision and Pattern Recognition, pp. 4422-4431, 2018.
Huaxia Wang et al. A direct approach to robust deep learning using adversarial networks. In International Conference on Learning Representations, 2019, pp. 15.
Yunseok Jang et al. Adversarial defense via learning to generate diverse attacks. In Proceedings of the IEEE International Conference on Computer Vision, . . . pp. 2740-2749, 2019.
Dmitry Ulyanov et al. Deep image prior. In Proceedings of the IEEE Conference on Computer Vision and Pattern Recognition, pp. 9446-9454, 2018.
Alexander Mordvintsev et al. Inceptionism: Going deeper into neural networks. https://research.googleblog.com/2015/06/inceptionism-going-deeper-into-neural.html, 2015 . . . Online; accessed Mar. 22, 2020, pp. 7.
Ian Goodfellow et al. Generative adversarial nets. In Advances in Neural Information Processing Systems, pp. 2672-2680, 2014.
Ian Goodfellow et al. NIPS 2016 tutorial: Generative adversarial networks. arXiv preprint arXiv:1701.00160, 2016, pp. 57.
Ishan Durugkar et al. Generative multi-adversarial networks. In International Conference on Learning Representations, 2017, pp. 14.
Tu Nguyen et al. Dual discriminator generative adversarial nets. In Advances in Neural Information Processing Systems, pp. 2670-2680, 2017.
Sanjeev Arora et al. Generalization and equilibrium in generative adversarial nets (GANs). In International Conference on Machine Learning, pp. 224-232, 2017.
Quan Hoang et al. Mgan: Training generative adversarial nets with multiple generators. In International Conference on Learning Representations, 2018, pp. 24.
Gongfan Fang et al., "Data-Free Adversarial Distillation", Mar. 2, 2020, 15 pages.
Xingang Pan et al., "Two at Once: Enhancing Learning and Generalization Capacities Via IBN-Net", Mar. 23, 2020, 16 pages.

(56) References Cited

OTHER PUBLICATIONS

Sudhanshu Mittal et al., "Semi-Supervised Semantic Segmentation with High- and Low-Level Consistency", Aug. 15, 2019, 11 pages.
Guobin Chen et al., "Learning Efficient Object Detection Models with Knowledge Distillation", 31st Conference on Neural Information Processing Systems (NIPS), 2017, 10 pages.
Taiwanese Search Report dated Jan. 8, 2025 issued in counterpart application No. 1100109481, 12 pages.

\* cited by examiner

100

METHOD AND APPARATUS FOR DATA-FREE NETWORK QUANTIZATION AND COMPRESSION WITH ADVERSARIAL KNOWLEDGE DISTILLATION

PRIORITY

This application is based on and claims priority under 35 U.S.C. § 119(e) to U.S. Provisional Patent Application filed on Mar. 23, 2020 and assigned Ser. No. 62/993,258, the entire contents of which are incorporated herein by reference.

FIELD

The present disclosure is generally related neural network using knowledge distillation.

BACKGROUND

Deep learning is now leading many performance breakthroughs in various computer vision tasks. The state-of-the-art performance of deep learning came with over-parameterized deep neural networks, which enable extracting useful representations (features) of the data automatically for a target task when trained on a very large dataset. The optimization framework of deep neural networks with stochastic gradient descent has become very fast and efficient recently with the backpropagation technique, using hardware units specialized for matrix/tensor computations such as graphical processing units (GPUs). The benefit of over-parameterization is empirically shown to be the key factor of the great success of deep learning, but once a well-trained high-accuracy model is found, its deployment on various inference platforms faces different requirements and challenges. In particular, to deploy pre-trained models on resource-limited platforms such as mobile or edge devices, the computational costs and memory requirements are the critical factors that need to be considered carefully for efficient inference. Hence, model compression, also called network compression, is an important procedure for development of efficient inference models.

SUMMARY

According to one embodiment, a method includes receiving, at a generator, a random input, producing, at the generator, a synthetic output of the received random input, receiving, at a teacher network, the synthetic output, receiving, at a student network, the synthetic output, minimizing a maximum of a distance between an output of the teacher network and an output of the student network, and constraining the generator.

According to one embodiment, a system includes a memory and a processor configured to receive, at a generator, a random input, produce, at the generator, a synthetic output of the received random input, receive, at a teacher network, the synthetic output, receive, at a student network, the synthetic output, minimize a maximum of a distance between an output of the teacher network and an output of the student network, and constrain the generator.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
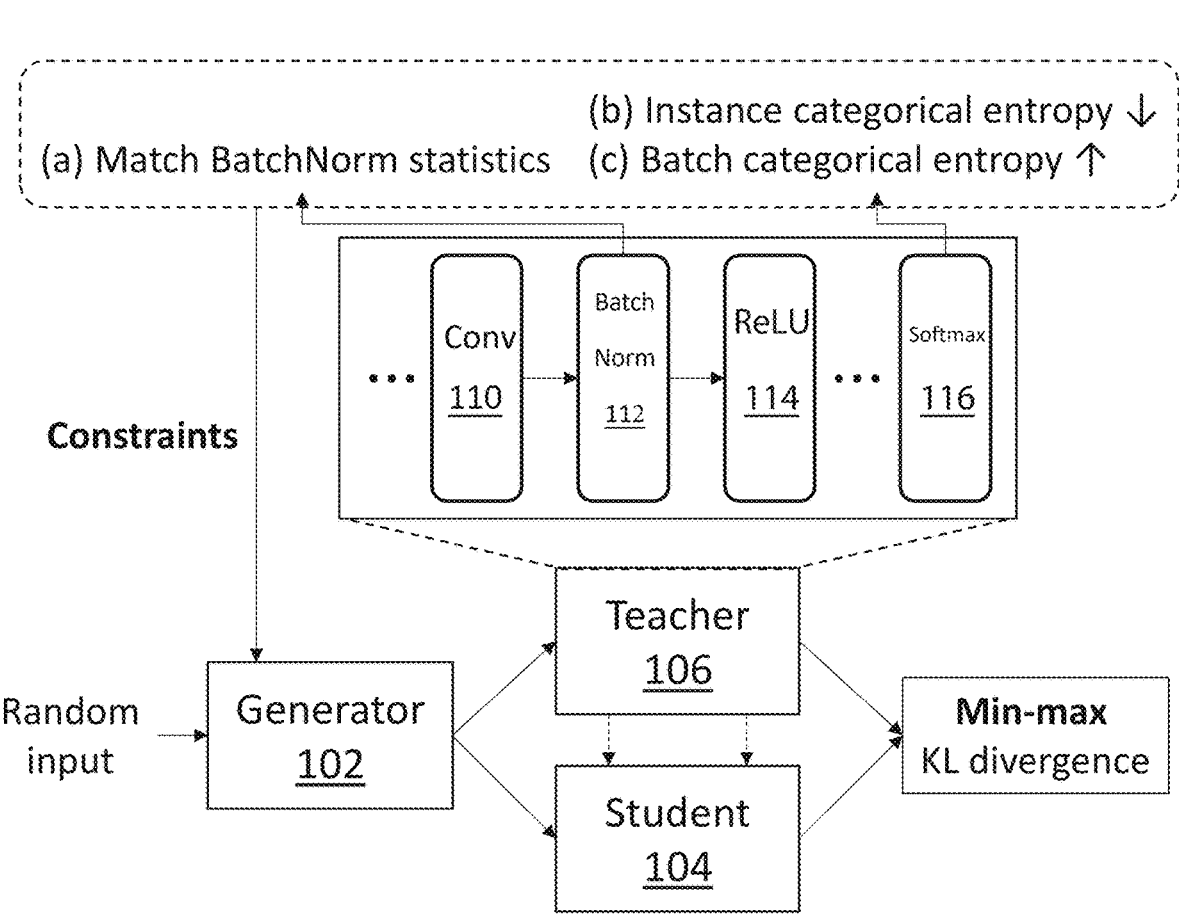
FIG. 1 illustrates a diagram of a data-free adversarial KD network, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Model compression includes various methods such as weight pruning, network quantization, and distillation to a network with a more efficient architecture. Weight pruning and network quantization reduce the computational cost as well as the storage/memory size without altering the network architecture. Weight pruning compresses a model by removing redundant weights completely from it by setting them to be zero, so computation as well as memorization for the pruned weights can be skipped. Network quantization reduces the memory footprint for weights and activations by quantization and is usually followed by lossless source coding for compression. Moreover, the convolutional and fully-connected layers can be implemented with low-precision fixed-point operations, such as 8-bit fixed-point operations, to lower latency and to increase power efficiency. On the other hand, the network architecture can be modified to be simpler and easier to implement on a target platform. For example, the number of layers and/or the number of channels in each layer can be curtailed. Conventional spatial-domain convolution can be replaced with more efficient depth-wise separable convolution as in MobileNet.

Knowledge distillation (KD) is a knowledge transfer framework to train a small "student" network under a guidance of a large pre-trained "teacher" model. One issue with existing model compression approaches (including KD) is that they are developed under a strong assumption that the original training data is accessible during the compression procedure. As datasets get larger, the distribution of datasets becomes more expensive and more difficult. Additionally, data privacy and security have emerged as one of primary concerns in deep learning, and consequent regulations and compliance requirements around security and privacy complicate both data sharing by the original model trainer and data collection by the model compressor, such as in the case of medical and bio-metric data. Thus, there is a strong need to compress a pre-trained model without access to the original or even alternative datasets.

The present system and method include an adversarial knowledge distillation framework, which minimizes the possible loss for a worst case (maximum loss) via adversarial learning, when the loss with the original training data is not accessible. Given any meta-data, the system and method utilize them to provide auxiliary losses for the generator to minimize in the adversarial learning framework. To avoid additional efforts to craft new meta-data to share, the statistics stored in batch normalization layers are used to constrain a generator to produce synthetic samples that mimic the original training data. Furthermore, the system and method use diverse synthetic samples by using multiple generators. The system and method may also perform adversarial KD concurrently for multiple students.

The system and method of data-free adversarial knowledge distillation may minimize the maximum of the Kullback-Leibler (KL) divergence between the teacher and student outputs. In the maximization step for training the generator to produce adversarial images, the system and method constrain the generator to produce synthetic images similar to the original data by matching the statistics from the batch normalization layers of the teacher, encouraging a small entropy for the output categorical distribution (softmax output) of each sample, and encouraging a large entropy for the output categorical distribution (softmax output) averaged over each batch. The system and method match the mean and the variance of the batch normalization layer input by using KL divergence of two Gaussian distributions. In the minimization step for KD, intermediate layer outputs can be matched optionally in addition to minimizing the KL divergence between the teacher and student softmax outputs.

The present system and method use multiple generators and multiple students to generator diverse synthetic images in adversarial knowledge distillation, perform data-free network quantization with adversarial knowledge distillation by letting the student be a quantized teacher and perform data-free network compression with adversarial knowledge distillation by letting the student be a smaller-size network.

Given any meta-data, the system and method utilize them to provide additional constraints for the generator to meet in the adversarial learning framework. To avoid additional efforts to craft new meta-data to share, the system and method use the statistics stored in batch normalization layers to train a generator to produce synthetic samples that mimic the original training data. Adding the auxiliary loss for the generator, the system and method constrain the generator so it produces synthetic images that yield similar statistics in the teacher as the original data, which helps the minimax optimization avoid any adversarial samples that are very different from the original data and leads to better distillation performance (reducing the loss due to fitting the model for "bad" examples not close to the original dataset).

The system and method utilizes batch normalization statistics to constrain generators. Furthermore, to match the mean and variance, the system and method use the KL divergence of two Gaussian distributions, which is a distance measure normalized by scale (i.e., standard deviation).

Robust optimization is a sub-field of optimization that addresses data uncertainty in optimization problems. Under this framework, the objective and constraint functions are assumed to belong to certain sets, called "uncertainty sets." The goal is to make a decision that is feasible no matter what the constraints turn out to be, and optimal for the worst-case objective function. With no data provided, the problem of data-free KD is formulated into a robust optimization problem, while the uncertainty sets can be constrained based on the pre-trained teacher using the statistics at its batch normalization layers.

Generating synthetic data that fool a pre-trained model is closely related to the problem of adversarial attacks. In adversarial attacks, there are also two approaches. First, generating adversarial images directly in the image domain and second, using generators to produce adversarial images.

Generator networks including a series of convolutional layers can be used as a good regularizer that can be impose for image generation as prior. Hence, generators are utilized, instead of adding any prior regularization that is employed to obtain synthetic images without generators.

Adversarial learning is used in Generative adversarial networks (GANs). Mode collapse is one of the well-known issues in GANs. A straightforward but effective way to overcome mode collapse is to introduce multiple generators and/or multiple discriminators. Using multiple generators and/or multiple students (a student may act as a discriminator) helps to produce diverse samples and avoid overfitting in our data-free KD network.

FIG. 1 illustrates a diagram of a data-free adversarial KD network, according to an embodiment. The network 100 includes a generator 102, a student 104 and a teacher 106. The teacher 106 includes a convolutional layer 110, a batch normalization layer 112, a rectified linear unit (ReLU) layer 114, and a softmax layer 116. The network minimizes the maximum of the KL divergence between the teacher 106 and student 104 outputs. In the maximization step for training the generator 102 to produce adversarial images, the generator 102 is constrained to produce synthetic images similar to the original data by matching the statistics from the batch normalization layers 112 of the teacher 106.

Figure 2:
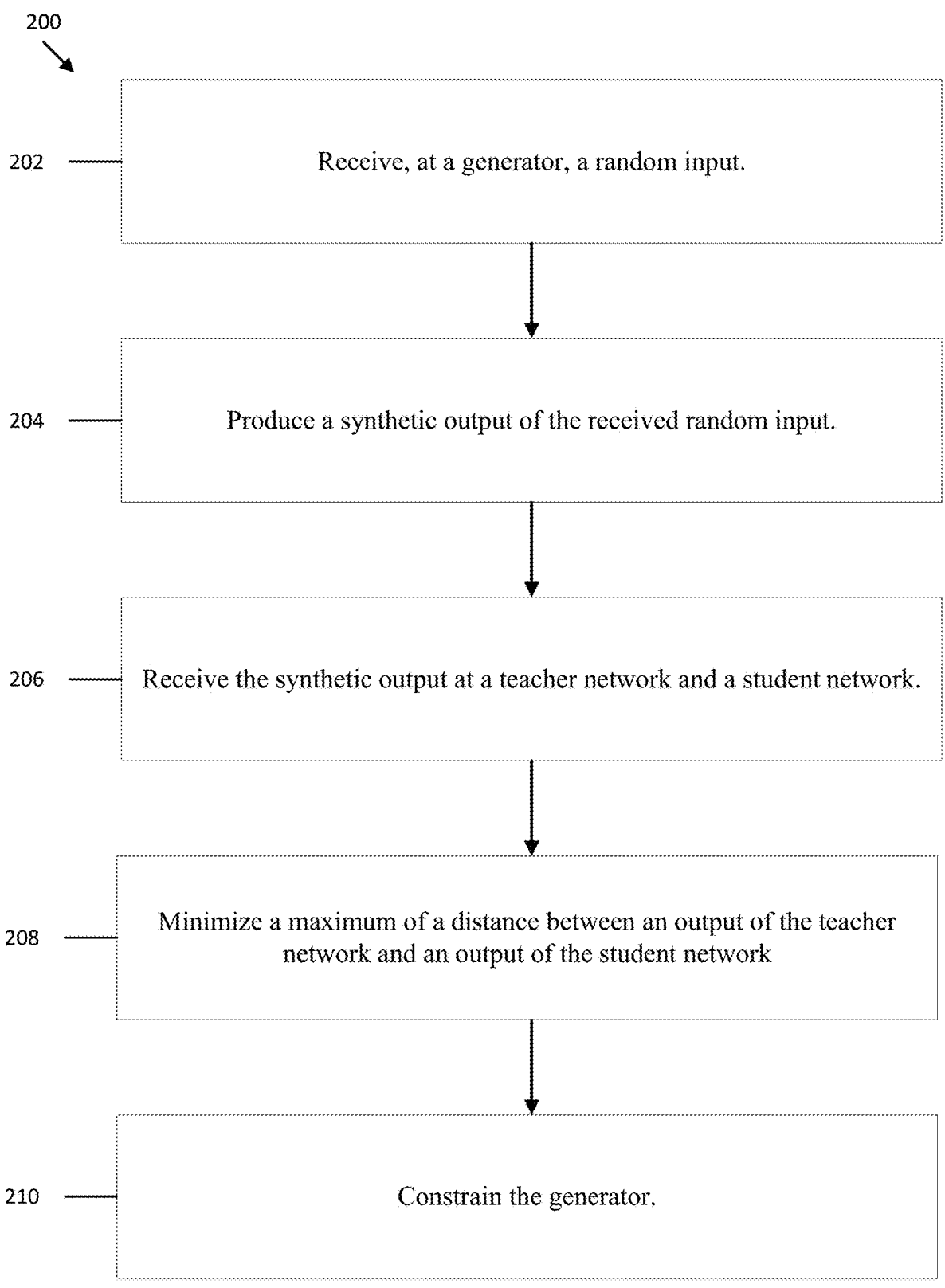
FIG. 2 illustrates a flowchart for a method of data-free adversarial knowledge distillation, according to an embodiment.

FIG. 2 illustrates a flowchart 200 for a method of data-free adversarial knowledge distillation, according to an embodiment. At 202, the system receives, at a generator, a random input. At 204, the system produces, with the generator, a synthetic output of the received random input. The synthetic output may be similar to the original data used to train the teacher. At 206, the system receives the synthetic output at a teacher network and a student network. At 208, the system minimizes a maximum of a distance between an output of the teacher network and an output of the student network. The distance may be a KL divergence. At 210, the system constrains the generator. The generator may be constrained by matching a mean and a variance of the at least one batch normalization layer.

A KD data-free model compression is described below. $t_\theta$ is a general non-linear neural network for classification, which is designed to yield a categorical probability distribution $P_\theta(y|x)$ for the label y of input x over the label set C (i.e., $t_\theta(x)=[P_\theta(y|x)]_{y \in C}$). y is the one-hot encoded ground-truth label y over the set C for input x. The network $t_\theta$ is pretrained with a labeled dataset, called training dataset, of probability distribution p(x,y) as in Equation (1):

$$\theta^* = \underset{\theta}{\arg\min}\ \mathbb{E}_{p(x,y)}[\mathcal{D}(y, t_\theta(x))] \tag{1}$$

where $\mathbb{E}$ (x,y) is, in practice, an empirical expectation over the training dataset, and $\mathcal{D}$ stands for Kullback-Leibler (KL) divergence. The minimization of the KL divergence is equivalent to the minimization of cross-entropy, given the distribution p(x,y).

Another neural network $s_\varphi$, called a "student", is possibly smaller and less complex than the pre-trained network $t_\theta$, called a "teacher". The student also produces its estimate of the categorical probability distribution for input x such that $s_\varphi(x)=[Q_\varphi(y|x)]_{y \in C}$. KD suggests to optimize the student by, as in Equation (2):

$$\underset{\phi\varphi}{\min}\ \mathbb{E}_{p(x,y)}[\mathcal{D}(y, s_\varphi(x)) + \lambda\mathcal{D}(t_\theta * (x), s_\varphi(x))] \tag{2}$$

where $\lambda \geq 0$. The temperature parameter is omitted for simplicity, which can be applied before softmax for $t_{\theta*}$ and $s_\varphi$ in the second KL divergence term of Equation (2).

As shown in Equation (2), the original KD is developed under the assumption that a training dataset is given for the expectation over p(x,y). However, sharing a large dataset is expensive and sometimes is not even possible due to privacy and security concerns. Hence, it is of interest to devise a method of KD in the situation where the training dataset is not accessible, but only a pre-trained teacher is given.

Robust optimization suggests minimizing the possible loss for a worst case scenario (maximum loss) with adversarial learning under data uncertainty, which is similar to the situation encountered when a training dataset for optimization is not provided. To adopt the robust min-max optimization (as known as adversarial learning) in KD, a generator network $g_\psi$, is introduced which is used to produce synthetic adversarial data for the input to KD. Then, using the minimax approach, data-free adversarial KD is given by Equation (3):

$$\underset{\varphi}{\min}\ \underset{\psi}{\max}\ \mathbb{E}_{p(z)}[\mathcal{D}(t_\theta * (g_\psi(z)), s_\varphi(g_\psi(z)))] - \alpha L_\psi \tag{3}$$

for $\alpha \geq 0$, where LW is an additional or auxiliary loss for the generator that a pre-trained teacher can provide based on the generator output. In Equation (3), $g_\psi(z)$ corresponds to step 202 and step 204, $t_{\theta*}(g_\psi(z))$, $s_\varphi(g_\psi(z))$ corresponds to step 206, the minimax operation corresponds to step 208, and $-\alpha L_\psi$ corresponds to step 210. Comparing Equation (2) with Equation (1), the first KL divergence term related to ground truth labels is omitted, as in Equation (4).

$$\underset{\phi}{\min}\ E_{p(x)}[\mathcal{D}(t_\theta * (x), s_\varphi(x))] \tag{4}$$

If there is a generator $g_{\psi*}$ optimized to mimic the training data exactly such that $p(x)=\int p(z)\delta(x-g_{\psi*}(z))dz$, then Equation (4) reduces to Equation (5).

$$\underset{\phi}{\min}\ \mathbb{E}_{p(z)}[\mathcal{D}(t_\theta * (g_\psi * (z)), s_\varphi(g_\psi * (z)))] \tag{5}$$

However, there is no access to the original training data, and the optimal generator $g_{\psi^*}$ cannot be found. Instead, the upper bound of $\mathbb{E}_{p(z)}[\mathcal{D}(t_\theta, s_\varphi)]$ is minimized by solving the minimax problem in Equation (3), giving the generator some constraints with the auxiliary loss $L_\psi$ for the generator to produce similar data as the original training data.

The following three auxiliary loss terms are considered for the generator in the maximization step of Equation (3) to make the generator produce "good" adversarial samples similar to the original data based on the teacher as much as possible. The first term includes batch normalization statistics. Batch normalization layers contain the mean and variance of layer inputs, which can be utilized as a proxy to confirm that the generator output is similar to the original training data. The KL divergence of two Gaussian distributions may be used to match the mean and variance stored in bath normalization layers (which are obtained from the original data) and the empirical statistics obtained with the generator output.

Another auxiliary loss term includes instance categorical entropy. If the teacher is trained well enough for accurate classification, the generator output is of interest only when the categorical distribution output (i.e., softmax output) of the teacher yields small entropy (the probability for one category should be high; the entropy is minimized to zero if one category has probability 1). That is, small entropy is needed for $t_{\theta^*}(g_\psi(z))$ for each sampled z.

A third auxiliary loss term includes batch categorical entropy. Assuming that each class appears in the dataset with similar probability, the categorical probability distribution averaged for any batch should tend to uniform distribution where the entropy is maximized to $\log_2 |C|$. That is, high entropy is needed for $\mathbb{E}_{p(z)}[t_{\theta^*}(g_\psi(z))]$.

$\mu(l,c)$ and $\sigma^2(l,c)$ represent the mean and the variance stored in batch normalization layer l for channel c, which is learned from the original training data. $\widehat{\mu_\psi}(l,c)$ and $\widehat{\sigma_\psi}(l,c)$ are the corresponding mean and variance computed for the synthetic samples from the generator $g_\psi$. The auxiliary loss $L_\psi$ for the generator is given by Equation (6):

$$L_\psi = \sum_{l,c} \mathcal{D}_N\left(\left(\widehat{\mu_\psi}(l,c), \widehat{\sigma_\psi}^2(l,c)\right), \left(\mu(l,c), \sigma^2(l,c)\right)\right) + \qquad (6)$$

$$\mathbb{E}_{p(z)}[H(t_\theta * (g_\psi(z)))] - H(\mathbb{E}_{p(z)}[t_\theta * (g_\psi(z))])$$

where H denotes the entropy and $\mathcal{D}_N((\hat\mu, \hat\sigma^2), (\mu, \sigma^2))$ is the KL divergence of two Gaussian distributions, which can be represented as Equation (7).

$$\mathcal{D}_N\left((\hat\mu, \hat\sigma^2), (\mu, \sigma^2)\right) = \frac{(\mu - \hat\mu)^2 + \hat\sigma^2}{2} - \log\frac{\hat\sigma}{\sigma} - \frac{1}{2} \qquad (7)$$

If $\alpha=0$ in Equation (3), the scheme reduces to the adversarial belief matching. Adding the auxiliary loss, the generator is constrained so it produces synthetic images that yield similar statistics in the teach as the original data, which helps the minimax optimization avoid any adversarial samples that are very different from the original data, which helps the minimax optimization avoid any adversarial samples that are very different from the original data and leads to better distillation performance. The system and method utilize batch normalization statistics to constrain generators. To match the mean and variance, the KL divergence of two Gaussian distributions is used, which is a distance measure normalized by scale.

The system and method train multiple generators in a data-free KD framework to increase the diversity of generated samples. Using multiple discriminators may reduce the mode collapse problem in GANs. The average KL divergence between the teacher and the students are maximized in the minimax optimization. Taking the average not only reduces the noise in the minimax optimization using stochastic gradient descent, but also steers a generator to produce better adversarial samples that are poorly matched to every student in average. The final objective with multiple generators and multiple students is given by Equation (8):

$$\min_{\varphi_i's} \max_{\psi_j's} \sum_{j=1}^{G}\left(\frac{1}{S}\sum_{i=1}^{S}\mathcal{D}_{\varphi_i,\psi_j} - \alpha L_{\varphi_j}\right), \qquad (8)$$

$$\mathcal{D}_{\varphi_i,\psi_j} \triangleq \mathbb{E}_{p(z)}\left[\mathcal{D}(t_\theta * (g_{\psi_j}(z)), s_{\varphi_i}(g_{\psi_j}(z)))\right]$$

where $s_{\varphi_i}$ is the i-th student and go is the j-th generator for $1 \le i \le S$ and $1 \le j \le G$.

In a warm-up stage, generators are trained only to minimize the auxiliary loss so its output matches batch normalization statistics and entropy constraints when fed to the teacher. This pre-training procedure reduces generation of unreliable samples in the early steps of data-free KD. Furthermore, updating students more frequently than generators reduces the chances of falling into any local maximum in the minimax optimization. In the minimization step, one can additionally match intermediate layer outputs. Data-free network quantization is implemented by letting the student be a quantized version of the teacher.

The above algorithm is represented in Table 1.

TABLE 1

| Algorithm 1 Data-free adversarial knowledge distillation. |
|---|

Generator update interval: m > 1
Warm-up training for generators (optional):
for n:1 to $N_{warm-up}$ do
  for j:1 to G do
    $z_1^B \leftarrow [ (0, I)]_1^B$
    $\psi_j \leftarrow \psi_j - \eta\nabla_{\psi_j}R_{\psi_j}(z_1^B)$
  end for
end for
Adversarial knowledge distillation:
for n:1 to N do
  Maximization:
  if n $\equiv$ 0 mod m then
    for j:1 to G do
      $z_1^B \leftarrow [ (0, I)]_1^B$
      for i:1 to S do $$\mathcal{D}_{\phi_i,\psi_j}(z_1^B) \leftarrow \mathcal{D}(t_\theta \cdot (g_{\psi_j}(z_1^B)), s_{\phi_i}(g_{\psi_j}(z_1^B)))$$

end for $$\psi_j \leftarrow \psi_j + \eta\nabla_{\psi_j}\left(\frac{1}{S}\sum_{i=1}^{S}\mathcal{D}_{\phi_i,\psi_j}(z_1^B) - \alpha R_{\psi_j}(z_1^B)\right)$$

end for
  end if
  Minimization:
  b $\leftarrow \lfloor B/G \rfloor$
  for j:1 to G do
    $z_1^B \leftarrow [ (0, I)]_1^b$
    $x_1^{bj} \leftarrow$ concatenate($x_1^{b(j-1)}$, $g_{\psi_j}(z_1^B)$)
  end for
  for i:1 to S do TABLE 1-continued Algorithm 1 Data-free adversarial knowledge distillation.

$$\phi_i \leftarrow \phi_i - \eta \nabla_{\phi_i} \mathcal{D}\left(t_\theta \cdot \left(x_1^{bG}\right), s_{\phi_i}\left(x_1^{bG}\right)\right)$$

end for
end for

Figure 3:
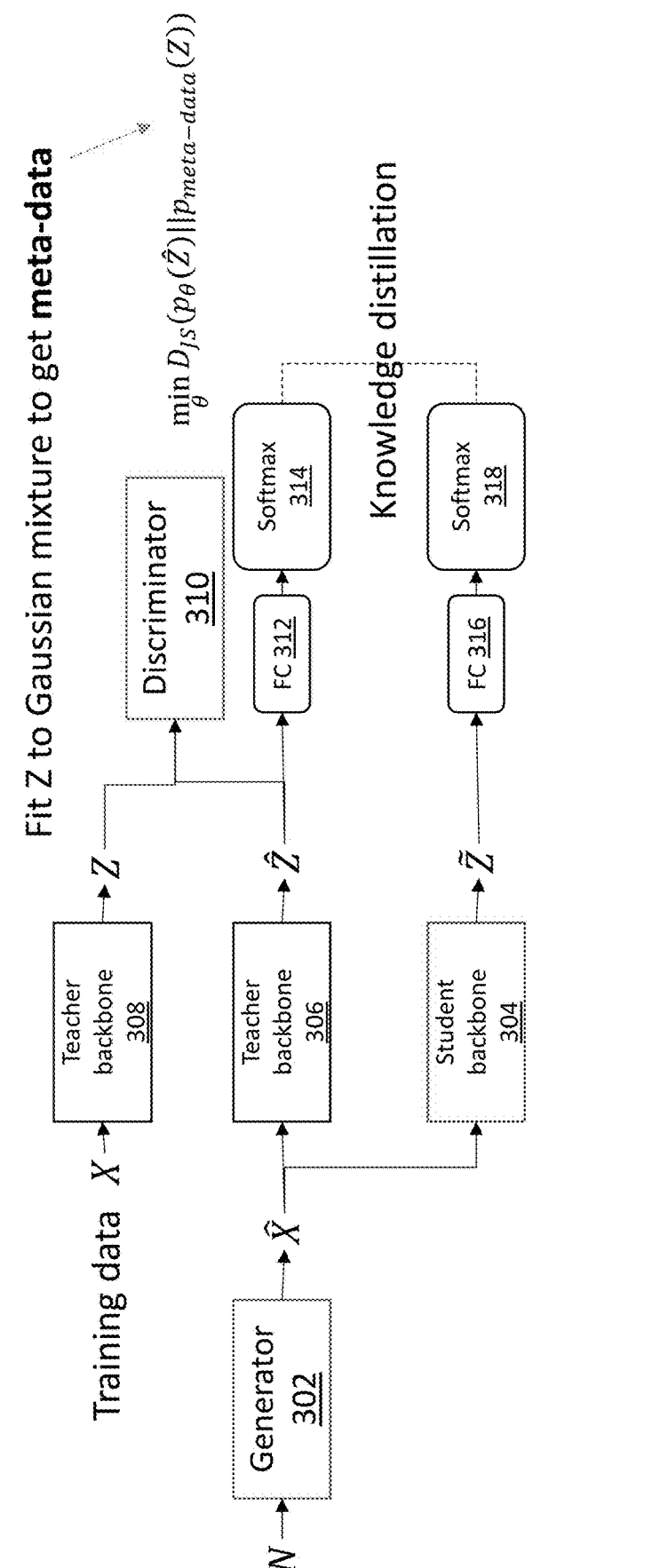
FIG. 3 illustrates a diagram of a data-free adversarial KD network, according to an embodiment.

FIG. 3 illustrates a diagram of a data-free adversarial KD network, according to an embodiment. The network 300 includes a generator 302, a student backbone network 304, a first teacher backbone network 306 and a second teacher backbone network 308. The network 300 also includes a discriminator 310, a first fully connected layer 312 with a first softmax layer 314, and a second fully connected layer 316 with a second softmax layer 318. As an alternative embodiment, the system and method can use any meta-data that are provided from the original model trainer or data owner, in addition to or instead of the statistics from batch normalization layers. For example, the mean and the co-variance of the feature map at some intermediate layers can be collected by the original model owner and can be provided as meta-data for compression and/or quantization of a model.

Provided meta-data, a GAN can be generated that matches the statistics stored in the meta-data and the statistics from the generator output. For example, one can model the last fully-connected layer input feature map as a Gaussian mixture and make the meta-data store the Gaussian mixture parameters. Then, the GAN is trained to produce the same distribution as in the meta-data at the teacher.

In FIG. 3, N denotes the random input to the generator 302. The generator 302 produces a synthetic image A from the random input N. When the synthetic image X is fed to the teacher 306 and student 304, it results in Ẑ and Z as the input feature map to the last fully-connected layers 312 and 316, respectively. The meta-data stores the Gaussian mixture parameters for Z, where Z is the input feature map obtained with the original training data X. To generate synthetic data that are similar to the original data, their statistics in the teacher 308 are matched by minimizing Equation (9).

$$\min_\theta D_{JS}\left(p_\theta(\hat{Z}) \| p_{meta-data}(Z)\right). \qquad (9)$$

This can be performed by a GAN by using the minimax optimization in Equation (10).

$$\min_G \max_D E_{p_{meta-data}(z)}[\log \ D(z)] + E_{p(N)}[\log(1 - D(G(N)))]. \qquad (10)$$

In this framework, a discriminator 310 is introduced that evaluates whether the teacher feature map from the generator output has a similar statistics to the ones stored in the meta-data. After training the GAN, the generator 302 is used to generate synthetic data and use them for KD. The auxiliary loss term may include a distance to meta-data when the meta-data is provided, such as a Jensen-Shannon (JS) divergence.

Figure 4:
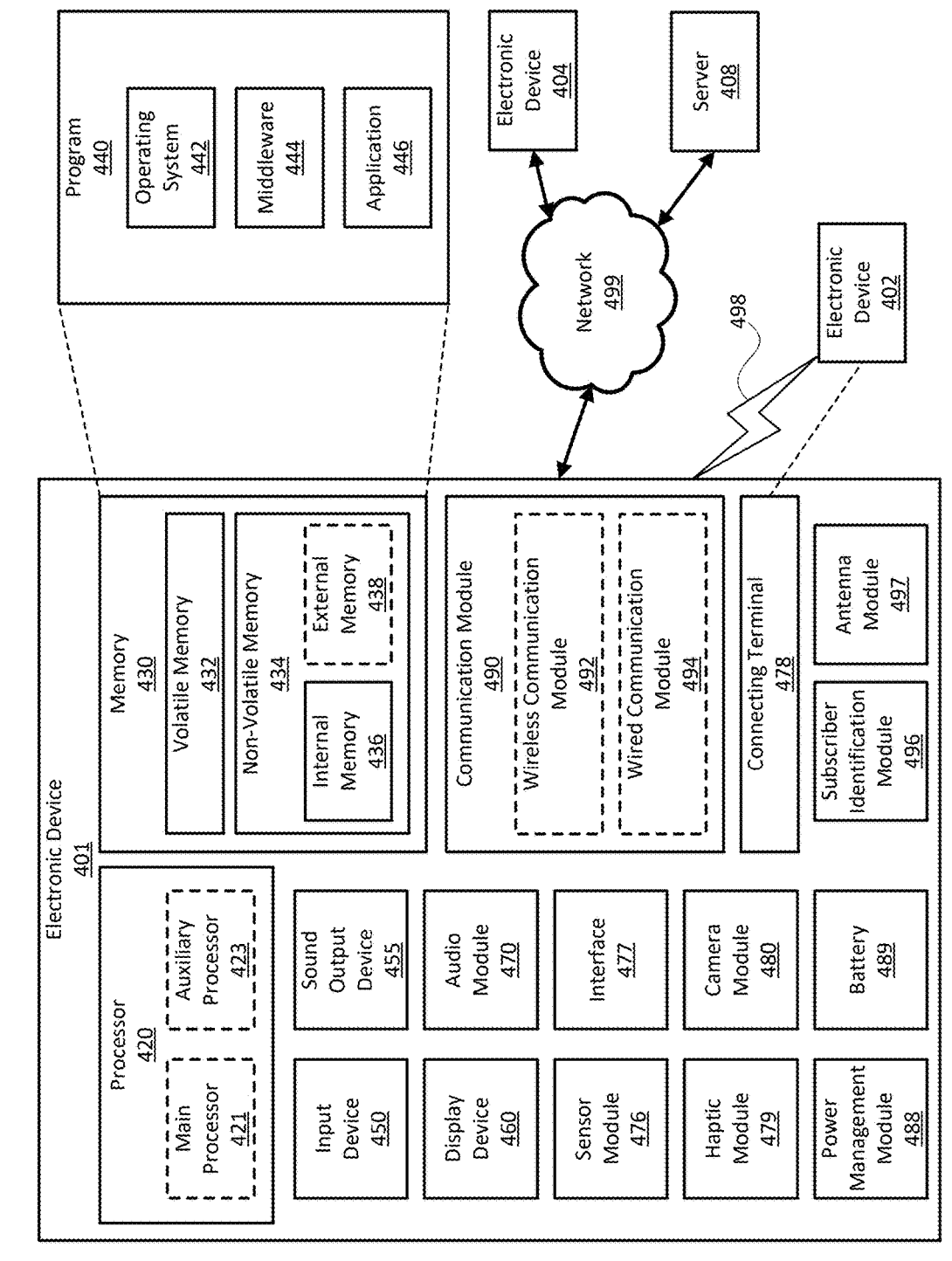
FIG. 4 illustrates a block diagram of an electronic device in a network environment, according to one embodiment.

FIG. 4 illustrates a block diagram of an electronic device 401 in a network environment 400, according to one embodiment. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. In one embodiment, some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to one embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to one embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to one embodiment, the audio module 470 may obtain the sound via the input device 450, or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. According to one embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. According to one embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. According to one embodiment, the haptic module 479 may include, for example, a motor, a piezoelectric element, or an electrical stimulator.

The camera module 480 may capture a still image or moving images. According to one embodiment, the camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. According to one embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to one embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth*™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to one embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that is readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for model compression, comprising:
   receiving, at a generator, a random input;
   determining, using a discriminator, whether a feature map of a first teacher network includes at least one similar statistic to stored meta-data that is stored in a non-transitory storage device,
     wherein the meta-data is Gaussian mixture parameters for an input feature map obtained with original training data in a second teacher network, and
     wherein the first teacher network includes a convolutional layer, a batch normalization layer which contains a mean and a variance of batch normalization layer inputs, a rectified linear unit layer, and a softmax layer;
   producing, at the generator, one or more adversarial images of the received random input, using the meta-data when the feature map of the first teacher network includes the at least one similar statistic;
   receiving, at the first teacher network, the one or more adversarial images;
   receiving, at a student network, the one or more adversarial images;
   minimizing a maximum of a distance between the feature map of the first teacher network and a feature map of the student network based on the one or more adversarial images; and
   constraining the generator by reducing a number of layers, channels, or weights based on the minimized maximum distance,
     wherein constraining the generator is performed based on a loss term defined according to a combination of a batch normalization statistics parameter derived from the batch normalization layer, an instance categorical entropy parameter, and a batch categorical entropy parameter calculated based on the one or more adversarial images generated by the generator and derived from the softmax layer, and
     wherein the batch normalization statistics parameter is computed based on a statistical divergence between the mean and the variance included in the batch normalization layer inputs of the first teacher network and a corresponding statistic of the one or more adversarial images generated by the generator.

2. The method of claim 1, wherein matching the mean and the variance of batch normalization layer inputs is performed utilizing a Kullback-Leibler (KL) divergence of two Gaussian distributions of the mean and the variance.

3. The method of claim 1, wherein the instance categorical entropy parameter of the generator is minimized to zero.

4. The method of claim 1, wherein the batch categorical entropy parameter is an averaged batch categorical probability distribution of a dataset including the random input.

5. The method of claim 1, wherein minimizing the maximum of the distance includes matching intermediate layer outputs.

6. A system for model compression, comprising:

a memory; and a processor configured to:

receive, at a generator, a random input;

determine, using a discriminator, whether a feature map of a first teacher network includes at least one similar statistic to stored meta-data that is stored in the memory, wherein the meta-data is Gaussian mixture parameters for an input feature map obtained with original training data in a second teacher network, and wherein the first teacher network includes a convolutional layer, a batch normalization layer which contains a mean and a variance of batch normalization layer inputs, a rectified linear unit layer, and a softmax layer;

produce, at the generator, one or more adversarial images of the received random input, using the meta-data when the first feature map of the teacher network includes the at least one similar statistic;

receive, at the first teacher network, the one or more adversarial images;

receive, at a student network, the one or more adversarial images;

minimize a maximum of a distance between the feature map of the first teacher network and a feature map of the student network based on the one or more adversarial images; and constrain the generator by reducing a number of layers, channels, or weights based on the maximum of the distance, wherein constraining the generator is performed based on a loss term defined according to a combination of a batch normalization statistics parameter derived from the batch normalization layer, an instance categorical entropy parameter, and a batch categorical entropy parameter calculated based on the one or more adversarial images generated by the generator and derived from the softmax layer, and wherein the batch normalization statistics parameter is computed based on a statistical divergence between the mean and the variance included in the batch normalization layer inputs of the first teacher network and a corresponding statistic of the one or more adversarial images generated by the generator.

7. The system of claim 6, wherein matching the mean and the variance of the batch normalization layer inputs is performed utilizing a Kullback-Leibler (KL) divergence of two Gaussian distributions of the mean and the variance.

8. The system of claim 6, wherein the instance categorical entropy parameter of the generator is minimized to zero.

9. The system of claim 6, wherein the batch categorical entropy parameter is an averaged batch categorical probability distribution of a dataset including the random input.

10. The system of claim 6, wherein minimizing the maximum of the distance includes matching intermediate layer outputs.

* * * * *